(12) United States Patent
Wong et al.

(10) Patent No.: US 8,683,361 B2
(45) Date of Patent: Mar. 25, 2014

(54) PRESENTATION OF HEADERS FOR GROUPS OF LOCATIONS IN AN ELECTRONIC LIBRARY

(75) Inventors: Lyon K. F. Wong, Issaquah, WA (US); Donna B. Andrews, Shoreline, WA (US); Ashley E. Averett, Sammamish, WA (US); Michael J. Gilmore, Bothell, WA (US); Paul A. Gusmorino, III, Seattle, WA (US); Michael Pell, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 1105 days.

(21) Appl. No.: 12/147,622

(22) Filed: Jun. 27, 2008

(65) Prior Publication Data

US 2009/0327936 A1    Dec. 31, 2009

(51) Int. Cl.
*G06F 3/048* (2013.01)
(52) U.S. Cl.
USPC .......................................... 715/764; 715/810
(58) Field of Classification Search
USPC .......... 715/764, 810, 835; 707/777, 778, 822, 707/825, 828, 829, 830, 831
See application file for complete search history.

(56) References Cited

U.S. PATENT DOCUMENTS

| | | | | |
|---|---|---|---|---|
| 5,065,347 | A * | 11/1991 | Pajak et al. | 715/835 |
| 5,751,287 | A * | 5/1998 | Hahn et al. | 715/775 |
| 7,162,488 | B2 * | 1/2007 | DeVorchik et al. | 1/1 |
| 7,996,366 | B1 * | 8/2011 | Smith | 707/662 |
| 2004/0193594 | A1 * | 9/2004 | Moore et al. | 707/4 |
| 2004/0207666 | A1 * | 10/2004 | Hally et al. | 345/854 |
| 2005/0246331 | A1 * | 11/2005 | De Vorchik et al. | 707/3 |
| 2005/0246640 | A1 * | 11/2005 | Lacy | 715/713 |
| 2005/0262452 | A1 * | 11/2005 | Sauermann | 715/853 |
| 2005/0289109 | A1 * | 12/2005 | Arrouye et al. | 707/1 |
| 2006/0195481 | A1 * | 8/2006 | Arrouye et al. | 707/104.1 |
| 2006/0200466 | A1 * | 9/2006 | Kaasten et al. | 707/7 |
| 2006/0265588 | A1 * | 11/2006 | Lim et al. | 713/166 |
| 2007/0050727 | A1 * | 3/2007 | Lewis-Bowen et al. | 715/779 |
| 2007/0124695 | A1 * | 5/2007 | Brodie et al. | 715/781 |
| 2008/0040665 | A1 * | 2/2008 | Waldeck | 715/277 |
| 2008/0306900 | A1 * | 12/2008 | Tamura | 707/1 |

OTHER PUBLICATIONS

The Windows Vista Book by Matt Kloskowski and Kleber Stephenson First Edition Apr. 2008 235-239.*
The Windows Vista Book by Matt Kloskowski and Kleber Stephenson First Edition Apr. 2008 pp. 235-239 total 6 pages.*

(Continued)

*Primary Examiner* — Omar Abdul-Ali
*Assistant Examiner* — Anil Bhargava
(74) *Attorney, Agent, or Firm* — Sung Kim; Andrew Sanders; Micky Minhas (57) ABSTRACT

The presentation of headers for groups of locations in a library comprising a collection of locations is disclosed. One disclosed embodiment comprises receiving a request to organize a library into groups according to a selected property, and organizing the locations into groups such that locations within a selected group have a common value of the selected property. If the common value of the selected property for the selected group corresponds to an object distinct from the locations in the group, then a first type of group header configured to accept a first set of user inputs associated with the header is displayed. Otherwise, a second type of group header configured to accept a second, different set of user inputs is displayed.

18 Claims, 7 Drawing Sheets

(56) References Cited

OTHER PUBLICATIONS

"Browsing Files", retrieved at <<http://macvswindows.com/index.php?title=Browsing_Files>>, pp. 14.

"How to Organize and Display Your Data with the Show in Groups Feature in Outlook 2007 and in Outlook 2003", 2008, Microsoft, pp. 2.

\* cited by examiner

Fig. 3

| NAME | DATE MODIFIED | TYPE |
|---|---|---|
| 📁 USER'S DOCUMENTS (3) C:\WHEREVER\THIS\LIVES | | |
| 📄 ACCOUNTING | 6/25/2007 | FILE FOLDER |
| 📄 MUTUAL FUNDS | 6/25/2007 | FILE FOLDER |
| 📄 HOMEWORK | 6/24/2007 | FILE FOLDER |
| 📁 LIBRARIES (3) \\WINGDINGS\SECURE\WIN\LIBRARIES | | |
| 📄 MISCELLANEOUS | 6/23/2007 | FILE FOLDER |
| 📄 LETTERS | 6/23/2007 | FILE FOLDER |
| 📄 ORGANIZATIONAL FILES | 6/24/2007 | TEXT DOCUMENT |

300 — (USER'S DOCUMENTS)
302 — (LIBRARIES)

Fig. 4

| NAME | DATE MODIFIED | TYPE | ▼ FOLDER |
|---|---|---|---|
| LIBRARIES (3) \\US\B'S DOCUMENTS (3) \\WINGDINGS\SECURE\WIN\LIBRARIES G:\WHEREVER\THIS\LIVES | | | |
| ACCOUNTING | 6/25/2007 | FILE FOLDER | |
| MUTUAL FUNDS | 6/25/2007 | FILE FOLDER | |
| HOMEWORK | 6/24/2007 | FILE FOLDER | |
| LIBRARIES (3) \\WINGDINGS\SECURE\WIN\LIBRARIES | | | |
| MISCELLANEOUS | 6/23/2007 | FILE FOLDER | |
| LETTERS | 6/23/2007 | FILE FOLDER | |
| ORGANIZATIONAL FILES | 6/24/2007 | TEXT DOCUMENT | |

| NAME | DATE MODIFIED | TYPE | FOLDER |
|---|---|---|---|
| USER'S DOCUMENTS (3) | | | |
| ORGANIZATIONAL FILES | | | |
| C:\WHEREVER\THIS\LIVES | | | |
| ACCOUNTING | 6/25/2007 | FILE FOLDER | |
| MUTUAL FUNDS | 6/25/2007 | FILE FOLDER | |
| HOMEWORK | 6/24/2007 | FILE FOLDER | |
| LIBRARIES (3) | | | |
| \\WINGDINGS\SECURE\WIN\LIBRARIES | | | |
| MISCELLANEOUS | 6/23/2007 | FILE FOLDER | |
| LETTERS | 6/23/2007 | FILE FOLDER | |
| ORGANIZATIONAL FILES | 6/24/2007 | TEXT DOCUMENT | |

| NAME | DATE MODIFIED | TYPE | FOLDER |
|---|---|---|---|
| ∧ ASD FILE (2) | | | |
| RESCUE.ASD | 11/9/2007 3:39 PM | ASD FILE | DOCUMENT |
| RESCUE1.ASD | 11/27/2007 6:37 PM | ASD FILE | DOCUMENT |
| ∧ BITMAP IMAGE (1) | | | |
| WALLPAPER | 5/19/2007 12:01 PM | BITMAP IMAGE | DOCUMENT |
| ∧ FILE FOLDER (3) | | | |
| DOWNLOADS | 1/15/2008 9:37 AM | FILE FOLDER | DOCUMENT |
| FAX | 11/21/2007 11:06 | FILE FOLDER | DOCUMENT |
| OFFSITE FILES | 6/5/2007 4:28 PM | FILE FOLDER | DOCUMENT |

| NAME | DATE MODIFIED | TYPE | FOLDER |
|---|---|---|---|
| > ASD FILE (2) | | | |
| RESCUE.ASD | 11/9/2007 3:39 PM | ASD FILE | DOCUMENT |
| RESCUE1.ASD | 11/27/2007 6:37 PM | ASD FILE | DOCUMENT |
| > BITMAP IMAGE (1) | | | |
| ∧ FILE FOLDER (3) | | | |
| DOWNLOADS | 1/15/2008 9:37 AM | FILE FOLDER | DOCUMENT |
| FAX | 11/21/2007 11:06 | FILE FOLDER | DOCUMENT |
| OFFSITE FILES | 6/5/2007 4:28 PM | FILE FOLDER | DOCUMENT |

700 ← 
702 ← 
704 ←

PRESENTATION OF HEADERS FOR GROUPS OF LOCATIONS IN AN ELECTRONIC LIBRARY

BACKGROUND

Collections of files and other electronic information may be presented on a graphical user interface of a computing device in various ways. For example, a "tree" view is sometimes used to show a hierarchical structure of folders. In such a view, a user generally may select a folder to view the individual files within a folder in a separate viewing pane from the tree view. In such a view, a user generally only views the contents of a single folder at a time.

A collection of files also may be presented in a "flattened" manner. In such a view, files from multiple folders may be presented as a collection of "locations", or paths that denote the location of each file. For example, search results from a file or folder search may be presented in such a view. A flattened view allows a user to view, in a single viewing pane, files located in various folders located at different depths and down different paths in a hierarchical structure. Furthermore, this view may allow a user to organize a collection of locations by a common property, thereby making it easier to locate items in the collection.

SUMMARY

Embodiments are disclosed herein that relate to the presentation of headers for groups of locations in a library comprising a collection of locations. For example, one disclosed embodiment comprises receiving a request to organize a library into groups according to a selected property, and organizing the locations into groups such that locations within a selected group have a common value of the selected property. If the common value of the selected property for the selected group corresponds to an object distinct from the locations in the group, then a first type of group header configured to accept a first set of user inputs associated with the header is displayed. Otherwise, a second type of group header configured to accept a second, different set of user inputs is displayed.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Prior to discussing the depicted embodiments in detail, it will be appreciated that the embodiments described herein may be implemented, for example, via computer-executable instructions or code, such as programs, stored on a computer-readable storage medium and executed by a computing device. Generally, programs include routines, objects, components, data structures, and the like that perform particular tasks or implement particular abstract data types. The term "program" as used herein may connote a single program or multiple programs acting in concert, and may be used to denote applications, services, or any other type or class of program. Likewise, the terms "computer" and "computing device" as used herein include any device that electronically executes one or more programs, and may comprise any suitable type of device, including but not limited to personal computers, servers, laptop computers, hand-held devices, cellular phones, microprocessor-based programmable consumer electronics and/or appliances, etc.

Figure 1:
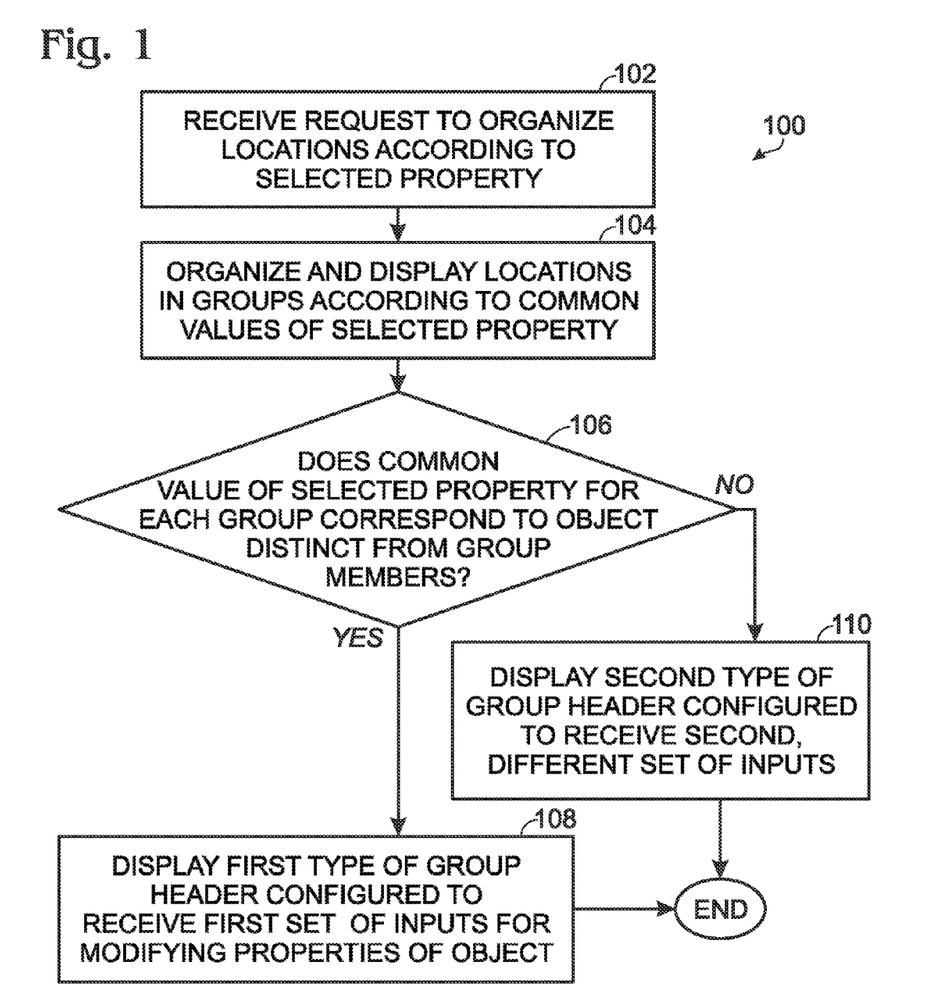
FIG. 1 shows a process flow depicting an embodiment of a method of displaying headers for groups of locations.

FIG. 1 shows an embodiment of a method 100 of displaying headers for groups of locations that are displayed in a flattened manner as a library. The term "library" as used herein denotes a collection of locations that can be displayed together as a collection. Each location in the library represents an item of electronic data found via the path shown in the location. Such data may comprise any suitable type of data, including but not limited to files, folders, programs, etc. Such libraries may be used in any suitable context on a computing device. For example, such libraries may be used to present results from a search performed across multiple locations (i.e. multiple folders under a root directory on a disk drive, multiple drives on a device, multiple remote locations over a network, etc.). Likewise, such libraries also may be used in a file management system to display files located at multiple levels and/or along multiple paths on a computing device. It will be understood that these use environments are described for the purpose of example, and are not intended to be limiting in any manner.

The display of multiple levels/paths of data in a library allows the locations in the library to be grouped according to a user-selected property to facilitate the location of information in the library. Examples of such properties that can be used to organize a library into groups include, but are not limited to, properties such as "type", "date created", "date modified", "folder" or "location", etc. As a specific example, if a library is grouped by "type", then locations in the library of the same type will be grouped together. Groups of locations may be separated by headers showing the value of the property for that group that allow a user scrolling through the library to easily locate a group of interest. Thus, a library grouped by "type" may include headers separating locations of different types, such as different types of files, folders, etc. Likewise, a library grouped by folder or the like may include headers that separate the library by different locations.

Continuing with FIG. 1, method 100 next comprises, at 102, receiving a request to organize the locations into groups according to a selected property. In response to this request, method 100 comprises, at 104, organizing the locations into groups such that locations within a selected group have a common value of the selected property. Next, it is determined, at 106, if the common value of the selected property for the selected group corresponds to an object distinct from the locations in the group. If so, then method 100 comprises, at 108, displaying for the selected group a first type of group header configured to accept a first set of user inputs associated with the header. On the other hand, if the common value of the selected property for the selected group does not correspond to an object distinct from the locations in the group, them method 100 comprises, at 110, displaying for the selected group a second type of group header configured to accept a second, different set of user inputs.

Method 100 enables group headers to have different functionalities depending upon whether the common value of the selected property represents an object separate from the locations grouped under the header, such as a parent folder of the locations grouped under the header, or whether the header is merely metadata that is descriptive of the common property of the locations grouped under the header. As a specific example, where a library is organized into groups by location ("location groups"), the header for each group ("location group header") signifies a parent folder, parent directory, or other such parent location that contains all of the child locations grouped under the header.

Such folders and/or directories are objects separate from the items contained in the folder or directory, and a user can interact with the folders and/or directories separately from the items contained in the folders or directories. Therefore, a location group header may be configured to accept a set of user inputs that allow a user to interact with the header in a manner distinct from the locations grouped under the header. In this manner, a user may modify a property of the object represented by the header by interacting with the header. Examples of operations a user may perform on a location group header include, but are not limited to, renaming the header (and thereby renaming the underlying folder or directory), dragging the header into another location header to move the location of the underlying folder or directory, dragging a location from one location group into the header of another location group to move the item signified by the location into the directory or folder signified by the destination location group header, etc. It will be understood that the term "folder" may be used herein to indicate a folder, directory, sub-directory, node, other like entities in a file structure, network servers, disk drives, other storage device, and/or any data storage, management or organizational entity that can be expressed by a location or address.

In contrast, where a library is organized into groups by type, date created, date modified, and other such properties, the header for each group ("non-location group header") signifies a common value of the property shared by locations organized under the header. Therefore, such non-location group headers do not signify objects separate from the locations organized under the headers. Because such headers do not signify distinct objects, such header may be configured to accept a different set of user inputs than location group headers. As a non-limiting example, such headers may be selectable by a user to perform a "select all" command, and/or may be selectable toggle between an expanded view and a hidden view of the locations grouped under the header.

The first and second types of group headers may have different appearances. This may help users to recognize that the first and second types of group headers represent different types of information and accept different sets of user inputs. For example, in embodiments in which the first type of group header is a location group header, the header may include, for example, an icon similar to a folder or directory icon used in a file management system on the same computing device. In this manner, a user may immediately associate the header with a folder in the file management system, and interact with the header in a similar manner. Further, a location group header may comprise multiple lines of information, either combined with an icon or without an icon. For example, in some embodiments, a location group header may a folder name and a folder path in separate lines of text. Examples of suitable location group headers are described in more detail below.

In contrast to such location group headers, non location-group headers may have a different appearance to indicate to users the different nature of the headers compared to location group headers. For example, in some embodiment non-location group headers may comprise a single line of text indicating the value of the property common to the locations grouped under the header. In other embodiments, the non-location group headers may comprise an icon having a different appearance than the location group headers, and/or any other suitable difference to visually distinguish the non-location group headers from the location group headers. Examples of suitable non-location group headers are shown below.

Figure 2:
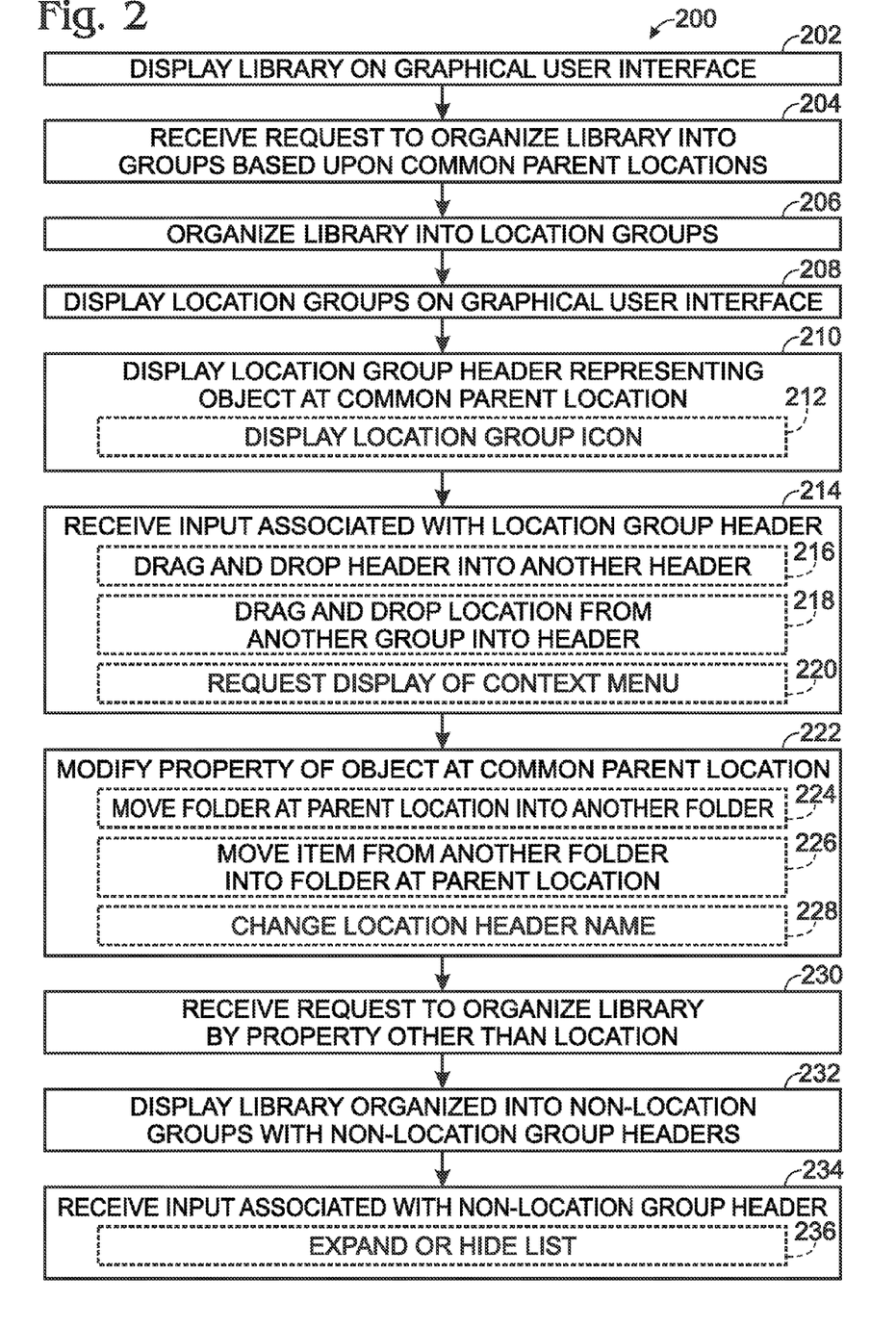
FIG. 2 shows a process flow depicting another embodiment of a method of displaying headers for groups of locations.

FIG. 2 shows an embodiment of a method 200 of displaying group headers in a library. Method 200 illustrates a manner in which a user may select to group items in a library by location, and then make an input associated with a location group header to modify a property of an object represented by the location group header. Method 200 comprises, at 202, displaying at least a portion of a library on a graphical user interface of a computing device display. Next, method 200 comprises, at 204, receiving a request to organize the library into groups based upon common parent locations. The term "parent locations" signifies folders, directories, drives, network locations, or any other such organizational node or object in a file structure, network structure, etc., under which one or more data items are located. Further, the term "common parent location" indicates the location of the folder under which the "child" data items in the location group are organized. In response to this request, method 200 next comprises, at 206, organizing the library into location groups in which items with a common location are grouped together, and at 208, displaying the groups.

Next, method 200 comprises, at 210, displaying a location group header for each location group. The location group headers represent the object (directory, folder, etc.) at the common parent location for the group, and are configured to accept a set of user inputs to allow a user to interact with the object separately from the locations grouped under the header.

Figure 3:
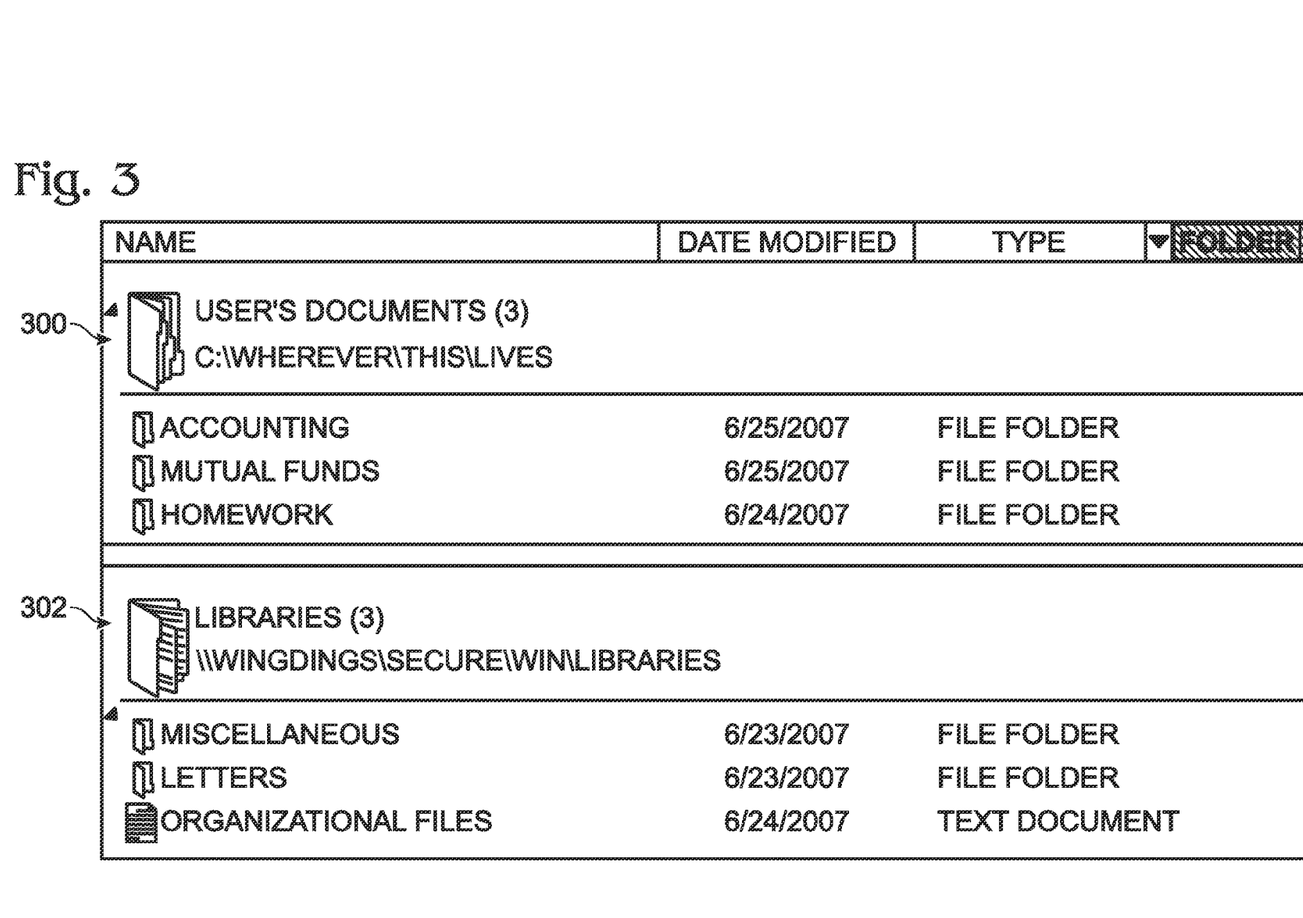
FIG. 3 shows a view of a user interface depicting embodiments of location group headers for location groups.

As described above, the location group headers may have a different appearance than non-location group headers to signify the different properties of the location group headers from non-location group headers. For example, the location group headers may comprise two or more lines of information, including but not limited to a location name and a location path. The location group headers also may comprise an icon that identifies the header as a location group header, as indicated at 212. FIG. 3 shows, at 300 and 302, two non-limiting examples of embodiments of location group headers each comprising a folder icon that symbolizes the presence of a folder at the common parent location of the group members. Further, the examples also show two lines of textual information, one indicating the title of the folder at the common parent location and another indicating a path showing the location of the folder. In contrast, non-location group headers may comprise a lesser amount of information (for example, fewer lines of information), and may comprise no icon, a different icon than the location group headers, or may be visually distinguished from the location group headers in any other suitable manner.

Continuing with FIG. 2, method 200 next comprises, at 214, receiving a user input associated with a selected location group header, and then, at 222, modifying a property of the object represented by the location group header (e.g. the folder at the common parent location of the selected group) in response to the input. The term "associated with" used in this context signifies a user input configured to cause an interaction with the selected location group header as opposed to and interaction with locations within the associated location group.

Figure 4:
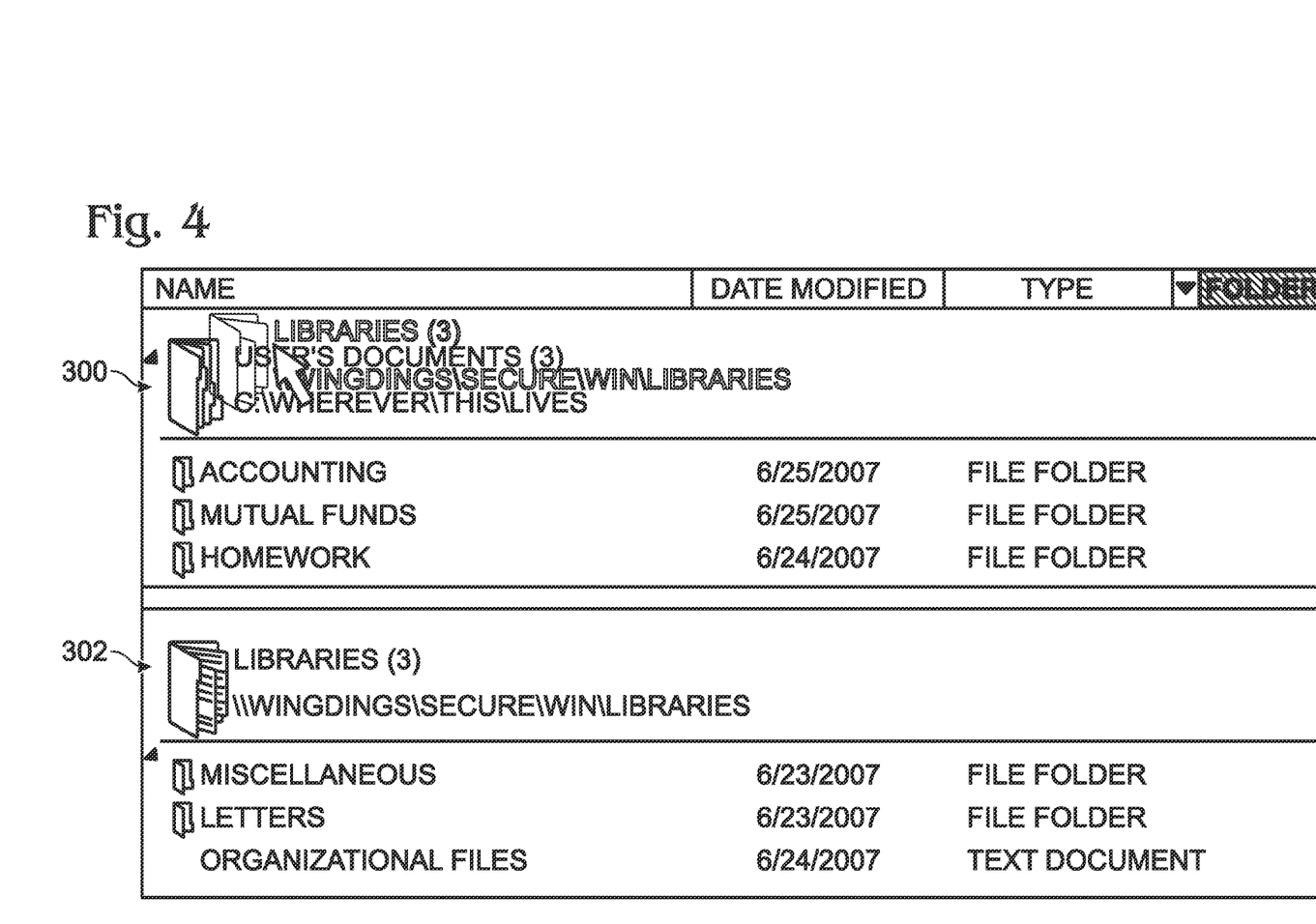
FIG. 4 shows a view of the user interface of FIG. 3, illustrating a drag and drop movement of one location header into another location group header.

FIG. 2 shows some non-limiting examples of such inputs. For example, as indicated at 216, the user input may comprise a drag and drop operation in which a user graphically moves a first location group header over another location group header. As indicated at 224, such an input may be configured to cause the folder represented by the moved header to be moved to a location within the folder represented by the destination header, such that the moved folder becomes a child of the destination folder. Such an operation is illustrated in FIG. 4, in which the location group header titled "LIBRARIES" is dragged and dropped into the location group header titled "USER'S DOCUMENTS".

Figure 5:
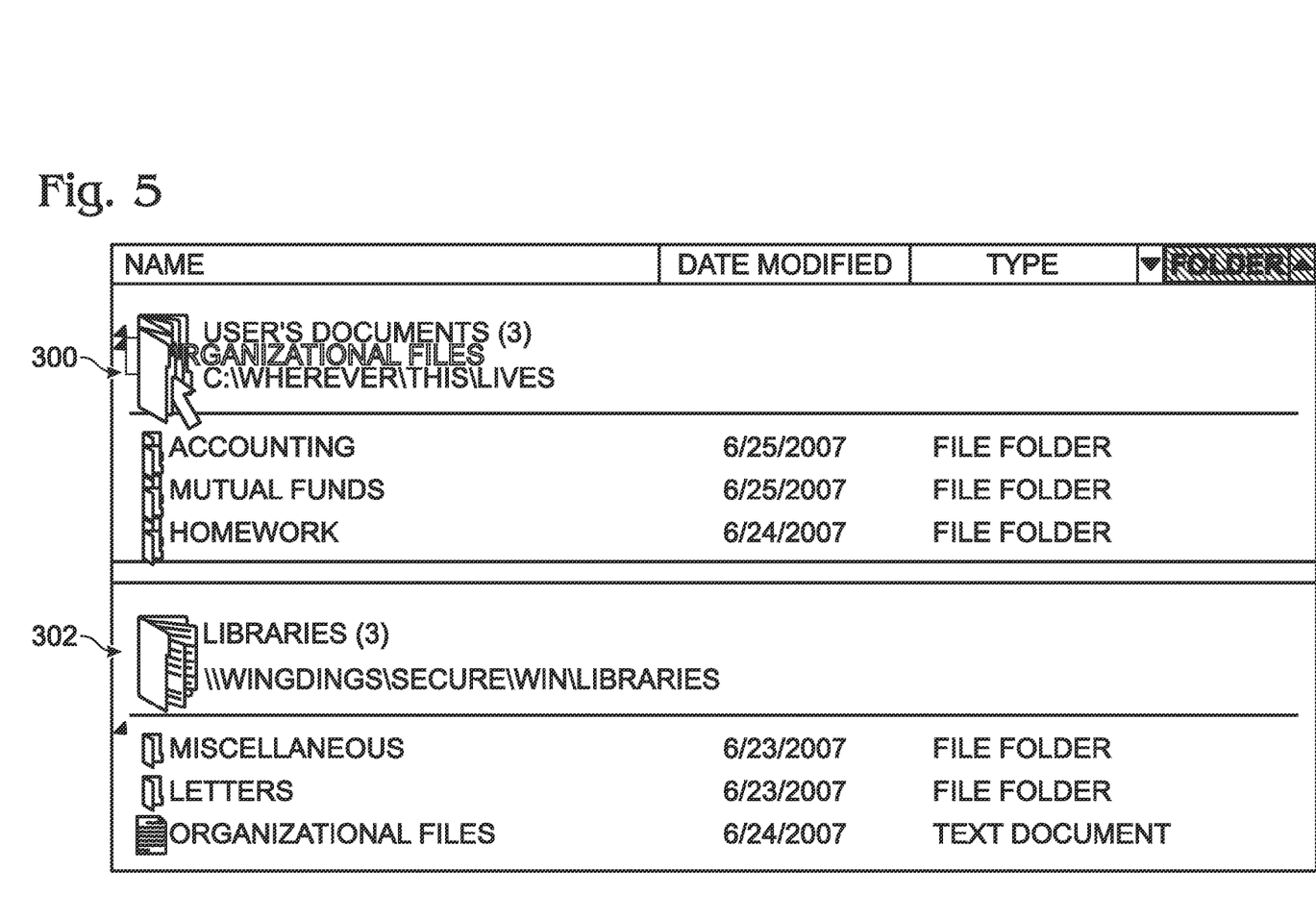
FIG. 5 shows a view of the user interface of FIG. 3, illustrating a drag and drop movement of a location from one location group into a location group header of another location group.

Additionally, as indicated at 218, the user input may comprise a drag and drop operation in which a user graphically moves a location from one location group over the header of another location group. As indicated at 226, such an input may be configured to cause the location from the first group to be moved into the folder represented by the destination header. Such an operation is illustrated in FIG. 5, in which a location within the "LIBRARIES" location group that represents a document titled "ORGANIZATIONAL FILES" is dragged and dropped into the "USER'S DOCUMENTS" location group header.

Figure 6:
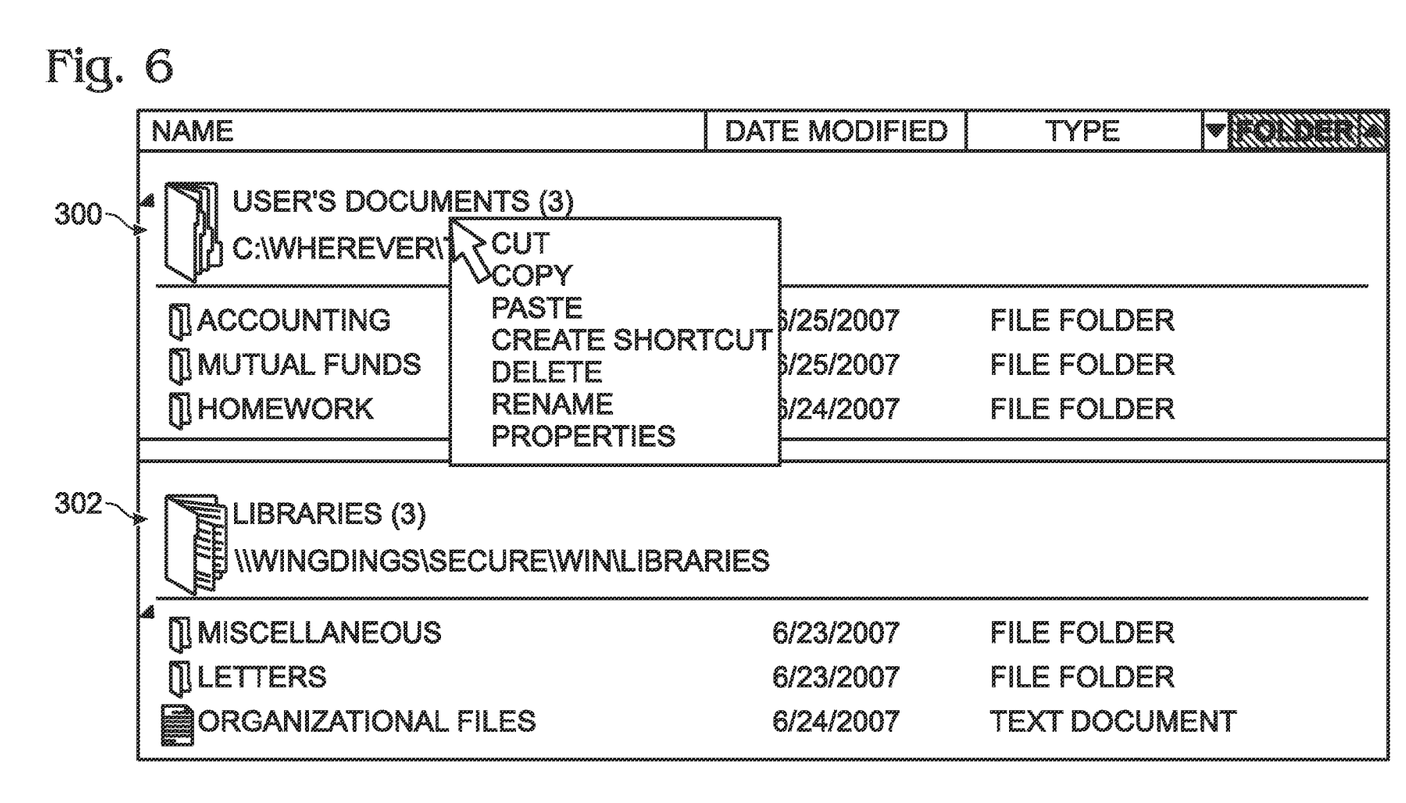
FIG. 6 shows a view of the user interface of FIG. 3, illustrating an embodiment of a context menu for a location header.

Further, as indicated at 220, a user may make an input configured to cause the display a context menu associated with the selected location group header. For example, as indicated at 228, the context menu may offer a user the ability to rename the folder represented by the location group header. FIG. 6 shows an embodiment of such a context menu. The depicted menu allows a user to cut, copy, paste, create a shortcut to, delete, and rename the folder located at the common parent location of the group, as well as to view and/or modify various properties of the folder. It will be understood that these operations are shown for the purpose of example, and that a context menu may contain any suitable set of operations other than the set shown in the depicted embodiment.

Continuing with FIG. 2, method 200 next comprises, at 230, receiving a request to organize a library via a property other than location. For example, a user may request to organize a library by "name, by "type" (i.e. file type, folder, etc.), by "date created", by "date modified", by "size", etc. In response, method 200 comprises, at 232, displaying the library organized into non-location groups by common value of the requested property. For example, where a user requests to organize a library by "name", the locations may be grouped into "name groups" alphabetically according to the names of the files at each location. Such groups may have "name headers" that separate each group, for example, by individual letter, by ranges of letters, by the first two letters of a name, etc.

Figure 7:
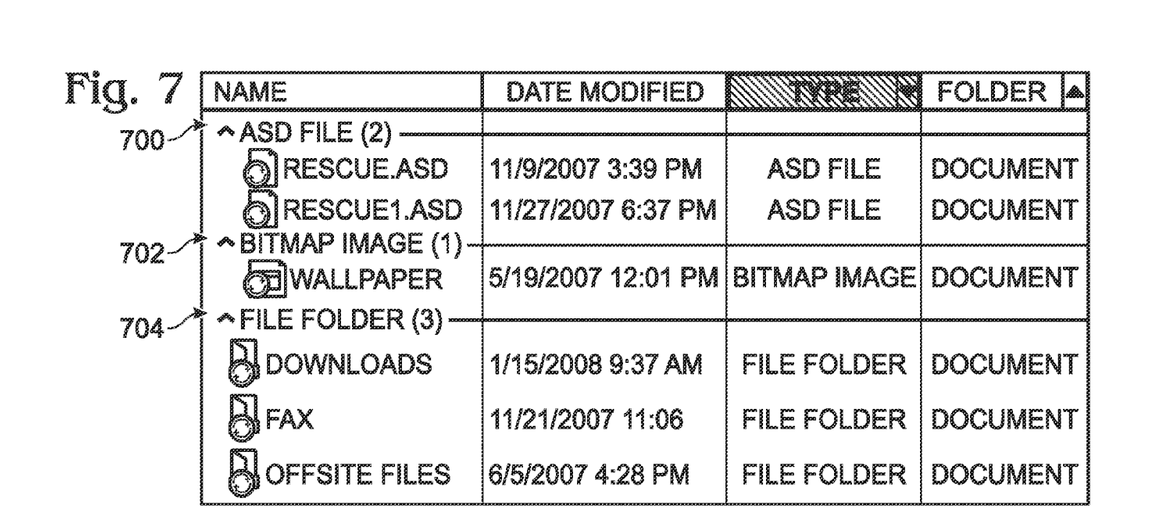
FIG. 7 shows a view of a user interface depicting embodiments of non-location group headers.

FIG. 7 shows another example of a portion of a library grouped by a property other than location. In this example, the library is grouped by type. As shown in the figure, files of a common file type (e.g. ASD files, bitmap files) are grouped together under separate headers, shown in FIG. 7 at 700 and 702, respectively. Likewise, folders are grouped separately from files, and also have a separate header 704 showing the data type as "file folder". Therefore, as opposed to location groups, the headers for these non-location groups do not represent an object distinct from the group members, but instead display metadata related to the group, such as the common group value of the property used to perform the grouping operation.

Figure 8:
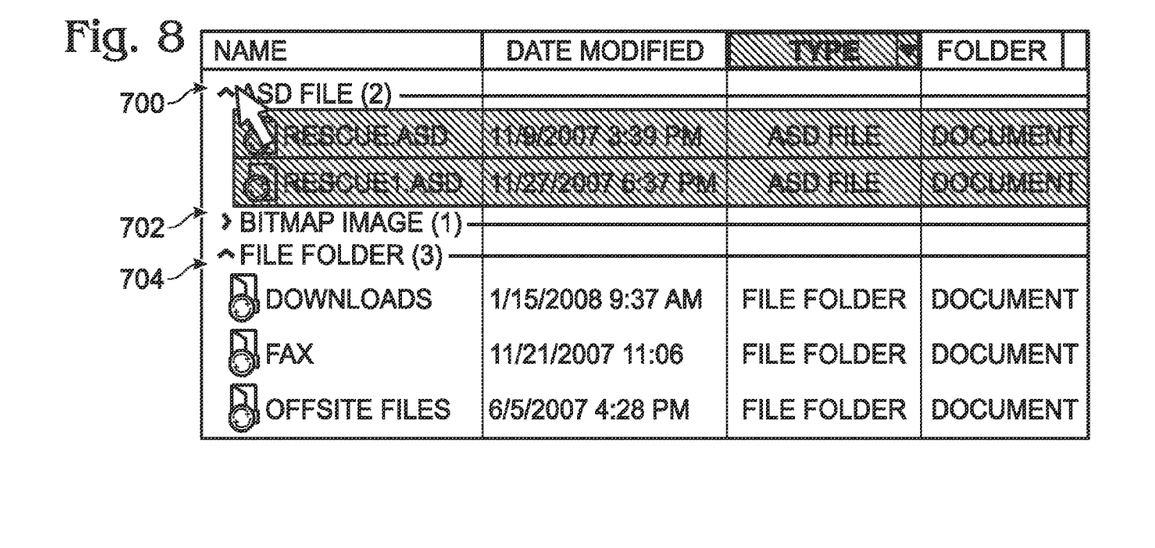
FIG. 8 shows the user interface of FIG. 7, illustrating an example of a response of the user interface to a user input associated with a non-location group header.

Referring to FIG. 7, each non-location group header in the depicted embodiment has a single line of information, namely, the type of data in that group. and also an arrow icon located to the left of the text portion of the header. Because the non-location group headers to not represent a distinct object, the non-location group headers are configured to accept a different set of user inputs than the location group headers. For example, as depicted in FIG. 8, the group header may be configured to act as a proxy for all group members. In this example, a user may make a user input located over the header to select all locations in the group. Further, a user may select to expand or hide the list of the locations organized under the header, as shown for the folder "Bitmap Image." It will be understood that these operations are described for the purpose of example, and that a non-location group header may be configured to accept any other suitable set of user inputs.

While location group headers and non-location group headers are described herein as having different appearances, such as different numbers of lines of information, different icons, etc., it will be understood that these two types of headers may have a similar appearance yet different sets of supported user inputs. Further, it will be understood that the concepts described herein may also apply to any other type of group header other than location group header that represents an object separate from the locations grouped under the header.

It will further be appreciated that the configurations and/or approaches described herein are exemplary in nature, and that these specific embodiments or examples are not to be considered in a limiting sense, because numerous variations are possible. The specific routines or methods described herein may represent one or more of any number of processing strategies such as event-driven, interrupt-driven, multi-tasking, multi-threading, and the like. As such, various acts illustrated may be performed in the sequence illustrated, in parallel, or in some cases omitted. Likewise, the order of any of the above-described processes is not necessarily required to achieve the features and/or results of the embodiments described herein, but is provided for ease of illustration and description. The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A computer-readable memory, the computer-readable memory containing instructions executable by a computing device to perform a method of displaying, on a computing device user interface, a library comprising a collection of locations, the method comprising:
   displaying for the library a plurality of properties by which the library is sortable, the plurality of properties including a location property and a non-location property;

receiving a request to organize the locations into groups according to a selected property of the plurality of properties displayed on the user interface;

organizing the locations into multiple groups such that locations within each group have a common value of the selected property; and if the common value of the selected property for each group corresponds to a parent location distinct from the locations in the group, then displaying for each group a first type of group header that separates the locations in the group from locations within an adjacent group and that is configured to accept a first set of user inputs associated with the header, the first set of user inputs including one or more of a drag and drop move of one group header into another group header, a drag and drop move of a location from one group into a group header of a different group, and a renaming of the group header; and if the common value of the selected property does not correspond to a parent location of the locations in each group, displaying for each group a second type of group header that separates the group from an adjacent group and that is different in appearance from the first type of group header and configured to accept a second, different set of user inputs.

2. The computer-readable memory of claim 1, wherein the selected property is location, wherein the parent location distinct from the locations in the group comprises a folder containing the locations in the group, and wherein the common value comprises a path of the folder.

3. The computer-readable memory of claim 2, wherein the first type of group header comprises an icon identifying the first type of group header as a folder.

4. The computer-readable memory of claim 2, wherein the first type of group header comprises two or more lines of information.

5. The computer-readable memory of claim 2, wherein the first type of group header comprises a display of a path specifying a location of the folder.

6. The computer-readable memory of claim 1, wherein the first set of user inputs further comprises one or more user inputs configured to modify a property of the parent location distinct from the locations in the group.

7. A method of presenting, via a computing device graphical user interface, a library comprising a collection of locations, the method comprising:

displaying at least a portion of the library on the graphical user interface and also displaying a plurality of properties by which the library is sortable, the plurality of properties including a location property and a non-location property;

receiving a request to organize the locations in the library into groups based upon common parent locations;

organizing the library into multiple location groups and displaying at least a portion of the location groups on the graphical user interface;

for each displayed location group, displaying a location group header above the locations in the group that separates the locations within group from locations within an adjacent group and that represents the common parent location for the location group, the location group header being configured to accept a user input to modify one or more properties of an object at the common parent location, the user input including one or more of a drag and drop move of one location group header into another location group header, a drag and drop move of a location from one location group into a location group header of a different group, and a renaming of the location group header;

receiving a first user input associated with the location group header; and in response to the first user input, modifying one or more properties of the object at the common parent location;

receiving a request to organize the library by a property other than location;

displaying the library organized into multiple non-location groups having non-location headers representing the property of the non-location groups according to the property other than location;

receiving a second user input associated with a non-location group header; and in response to the second user input, modifying a display of one or more objects in the non-location group based on the second user input.

8. The method of claim 7, wherein receiving the first user input comprises receiving a drag and drop input of a first location group header into a second location group header.

9. The method of claim 7, wherein receiving the first user input comprises receiving a user input requesting display of a context menu that allows a user to modify the one or more properties of the object at the parent location.

10. The method of claim 7, wherein receiving the first user input comprises receiving a requested change in a name of the common parent location.

11. The method of claim 7, wherein receiving the first user input comprises receiving a drag and drop input of a selected child location from a first location group into a second location group.

12. The method of claim 7, wherein the location group header comprises an icon symbolizing the object at the common parent location.

13. The method of claim 7, wherein the location group header comprises two or more lines of information.

14. The method of claim 13, wherein one line of information shows a location name, and another line of information shows a location path.

15. A method of presenting, via a computing device user interface, a library comprising a collection of locations, the method comprising:

displaying at least a portion of the library on the graphical user interface;

displaying for the library a plurality of organizational user interface controls corresponding to a plurality of properties by which the library is sortable, the plurality of properties including a location property and a non-location property;

receiving via a location property user interface control a request to organize the locations in the library into groups based upon common parent locations;

organizing the library into multiple location groups and displaying at least a portion of the location groups on the graphical user interface;

for each displayed location group, displaying a location group header that separates locations within the group from locations within an adjacent group and that represents the common parent location for the location group, the location group header being configured to accept a first set of user inputs that allow a user to modify one or more properties of an object at the common parent location, the first set of user inputs including one or more of a drag and drop move of one location group header into another location group header, a drag and drop move of a location from one group into a location group header of a different group, and a renaming of the group header;

receiving a request to organize the library by a property displayed in the user interface other than location;

displaying the library organized into multiple non-location groups having non-location headers representing the property of the non-location groups according to the property other than location, the non-location groups being different in appearance than the location groups and including multiple objects; and for each non-location group, displaying a non-location group header configured to accept a second set of user inputs that is different from the first set of user inputs.

16. The method of claim 15, wherein the second set of user inputs comprises a request to change between an expanded view in which locations within a selected location group are displayed and a hidden view in which locations within the selected location group are not displayed.

17. The method of claim 15, wherein the location group header comprises two or more lines of information.

18. The method of claim 15, wherein the location group header comprises an icon symbolizing the object at the common parent location.

* * * * *